United States Patent
Savchenkov et al.

(10) Patent No.: US 7,092,591 B2
(45) Date of Patent: Aug. 15, 2006

(54) TUNABLE OPTICAL FILTERS HAVING ELECTRO-OPTIC WHISPERING-GALLERY-MODE RESONATORS

(75) Inventors: Anatoliy Savchenkov, La Crescenta, CA (US); Vladimir Ilchenko, La Canada, CA (US); Andrey B. Matsko, Pasadena, CA (US); Lutfollah Maleki, Pasadena, CA (US)

(73) Assignee: California Institute of Technology, Pasadena, CA (US)

(*) Notice: Subject to any disclaimer, the term of this patent is extended or adjusted under 35 U.S.C. 154(b) by 200 days.

(21) Appl. No.: 10/772,218

(22) Filed: Feb. 3, 2004

(65) Prior Publication Data

US 2005/0128566 A1   Jun. 16, 2005

Related U.S. Application Data

(60) Provisional application No. 60/444,423, filed on Feb. 3, 2003.

(51) Int. Cl.
G02B 6/26   (2006.01)

(52) U.S. Cl. ............... 385/15; 385/27; 385/30; 385/39; 385/50

(58) Field of Classification Search ............... 385/15, 385/27, 30, 39, 50
See application file for complete search history.

(56) References Cited

U.S. PATENT DOCUMENTS

| 5,723,856 | A | 3/1998 | Yao et al. ............. 250/227.11 |
| 5,777,778 | A | 7/1998 | Yao ............................ 359/245 |
| 5,917,179 | A | 6/1999 | Yao ........................ 250/227.11 |
| 5,929,430 | A | 7/1999 | Yao et al. .................... 250/205 |
| 6,389,197 | B1 | 5/2002 | Iltchenko et al. ............. 385/28 |
| 6,417,957 | B1 | 7/2002 | Yao ............................ 359/334 |
| 6,473,218 | B1 | 10/2002 | Maleki et al. .............. 359/245 |
| 6,476,959 | B1 | 11/2002 | Yao ............................ 359/334 |
| 6,487,233 | B1 | 11/2002 | Maleki et al. .............. 372/108 |
| 6,488,861 | B1 | 12/2002 | Iltchenko et al. ............. 216/24 |
| 6,490,039 | B1 | 12/2002 | Maleki et al. .............. 356/436 |
| 6,535,328 | B1 | 3/2003 | Yao ............................ 359/334 |
| 6,567,436 | B1 | 5/2003 | Yao et al. ..................... 372/32 |
| 6,580,532 | B1 | 6/2003 | Yao et al. ..................... 398/39 |
| 6,580,851 | B1 | 6/2003 | Vahala et al. ................. 385/30 |
| 6,594,061 | B1 | 7/2003 | Huang et al. ............... 359/239 |
| 6,762,869 | B1 | 7/2004 | Maleki et al. .............. 359/239 |
| 6,865,317 | B1* | 3/2005 | Vahala et al. ................. 385/30 |
| 6,891,996 | B1* | 5/2005 | Sercel et al. .................. 385/30 |
| 6,891,997 | B1* | 5/2005 | Sercel et al. .................. 385/30 |
| 6,922,497 | B1* | 7/2005 | Savchenkov et al. ......... 385/15 |
| 2002/0018611 | A1 | 2/2002 | Maleki et al. ................ 385/15 |
| 2002/0044739 | A1 | 4/2002 | Vahala et al. ................. 385/30 |

(Continued)

FOREIGN PATENT DOCUMENTS

WO    WO0196936    12/2001

OTHER PUBLICATIONS

Dan Sadot, et al.; Tunable Optical Filters for Dense WDM Networks; Dec. 1998; IEEE Communications Magazine, pp. 50-55.

(Continued)

*Primary Examiner*—John D. Lee
(74) *Attorney, Agent, or Firm*—Fish & Richardson P.C.

(57) ABSTRACT

Tunable optical filters using whispering-gallery-mode (WGM) optical resonators-are described. The WGM optical resonator in a filter exhibits an electro-optical effect and hence is tunable by applying a control electrical signal.

30 Claims, 6 Drawing Sheets

U.S. PATENT DOCUMENTS

2003/0012504 A1    1/2003    Iltchenko .................... 385/39
2003/0231826 A1    12/2003    Boyd et al. .................. 385/27

OTHER PUBLICATIONS

Jaafar M.H. Elmirghani, et al.; Technologies and Architectures for Scalable Dynamic Dense WDM Networks; Feb. 2000; IEEE Communications Magazine, pp. 58-66.

Vladimir S. Ilchenko, et al.; Whispering-gallery-mode electro-optic modulator and photonic microwave receiver; Feb. 2003; J. Opt. Soc. Am. B, vol. 20, No. 2, pp. 333-342.

L.E. Myers, et al.; Quasi-phase-matched optical parametric oscillators in bulk periodically poled $LiNbO_3$; Nov. 1995; J.Opt. Soc. Am. B/vol. 12, No. 11; pp. 2102-2116.

* cited by examiner

TUNABLE OPTICAL FILTERS HAVING ELECTRO-OPTIC WHISPERING-GALLERY-MODE RESONATORS

This application claims the benefit of U.S. Provisional Application No. 60/444,423 entitled "TUNABLE FILTER BASED ON WHISPERING GALLERY MODES" and filed on Feb. 3, 2003.

This application also claims the benefit of U.S. patent application Ser. No. 10/702,201 entitled "OPTICAL FILTER HAVING COUPLED WHISPERING-GALLERY-MODE RESONATORS" and filed on Nov. 4, 2003, which issued as U.S. Pat. No. 6,987,914 on Jan. 17, 2006.

The entire disclosures of the above two patent applications are incorporated herein by reference as part of this application.

STATEMENT REGARDING FEDERALLY SPONSORED RESEARCH

The systems and techniques described herein were made in the performance of work under a NASA contract, and are subject to the provisions of Public Law 96-517 (35 USC 202) in which the Contractor has elected to retain title.

BACKGROUND

This application relates to optical filters based on optical resonators and cavities.

Optical filters have a wide range of applications. One type of commonly used optical filters is optical bandpass filters where optical spectral components within a spectral window transmit through the filter while other spectral components outside the spectral window are rejected. Optical resonators such as Fabry-Perot resonators may be used as such bandpass filters.

An optical whispering-gallery-mode ("WGM") resonator is a special optical resonator and supports a special set of resonator modes known as whispering gallery ("WG") modes. These WG modes represent optical fields confined in an interior region close to the surface of the resonator due to the total internal reflection at the boundary. Microspheres with diameters from few tens of microns to several hundreds of microns have been used to form compact optical WGM resonators. Such spherical resonators include at least a portion of the sphere that comprises the sphere's equator. The resonator dimension is generally much larger than the wavelength of light so that the optical loss due to the finite curvature of the resonators is small. As a result, a high quality factor, Q, may be achieved in such resonators. Some microspheres with sub-millimeter dimensions have been demonstrated to exhibit very high quality factors for light waves, e.g., ranging from $10^3$ to $10^9$ for quartz microspheres. Hence, optical energy, once coupled into a whispering gallery mode, can circulate within the WGM resonator with a long photon life time. Such hi-Q WGM resonators may be used in many optical applications, including optical filtering.

SUMMARY

This application describes various implementations of tunable optical filters using WGM resonators exhibiting electro-optic effects. In one implementation, an input optical signal is directed into an optical resonator configured to support whispering gallery modes and comprising a portion where the whispering gallery modes are present. At least the portion of the optical resonator exhibits an electro-optical effect. Light is coupled out of the optical resonator to produce a filtered optical output from the input optical signal. An electrical control signal is applied to at least the portion in the optical resonator to tune a spectral transmission peak of the optical resonator and thus to select spectral components in the input optical signal in the filtered optical output.

In the above implementation, a unmodulated optical beam may be split into first and second beams. The first beam is modulated as the input optical signal which carries a signal. The second beam may be directed through an optical delay path. The filtered optical output and the second beam after the optical delay path are combined to produce a combined optical signal. Next, the combined optical signal is converted into an electrical signal. The signal is then extracted from the electrical signal.

One implementation of the tunable filters is also disclosed to include an optical resonator, at least one electrode, and a control unit. The optical resonator is configured to support whispering gallery modes and comprising at s least a portion where the whispering gallery modes are present. At least the portion of the optical resonator exhibits an electro-optical effect. The electrode is formed on the optical resonator to guide an electrical control signal into the optical resonator to spatially overlap with the whispering gallery modes. The control unit is coupled to the at least one electrode to supply an electrical control signal to the one portion to tune a refractive index and thus a transmission peak of the optical resonator via the electro-optical effect.

One of the applications of the above tunable filter is to use it in a receiver which receives a radiation signal carrying a plurality of signal channels and extracts a selected channel from the received signal channels. This receiver may include an optical modulator to modulate an optical beam in response to the radiation signal to produce a modulated optical signal carrying the signal channels. The optical filter is located to receive and filter the modulated optical signal to produce a filtered optical output that carries only the selected signal channel. An optical detector is provided to convert the filtered optical output into an electrical signal. The receiver also includes a mixer that mixes the electrical signal with a reference signal to extract the selected signal channel.

These and other implementations are now described in greater details in the following drawings, the detailed description, and the claims.

DETAILED DESCRIPTION

A WGM resonator transmits light at a wavelength that is resonant with a WGM mode. The resonance condition of the WGM resonator, hence, produces a spectral transmission window with a a narrow bandwidth due to the high quality factor Q of the resonator. A WGM resonator may produce a Lorentzian-shaped filter function. The transmission peak of the WG resonator may be tuned by changing the refractive index experienced by the WG modes. Therefore, when the entire WGM resonator or at least the region where WG modes are present exhibits an electro-optic effect, an electrical control signal, such as a DC voltage, may be applied to the resonator to tune the filter function. As described below, such a tunable WGM resonator filter can be designed in a compact structure to have a wide tunable spectral range on the order of $10^9$ Hz with a low optical loss (e.g., around 20 dB or less) and a high tuning speed at about tens of microseconds or less.

Figure 1:
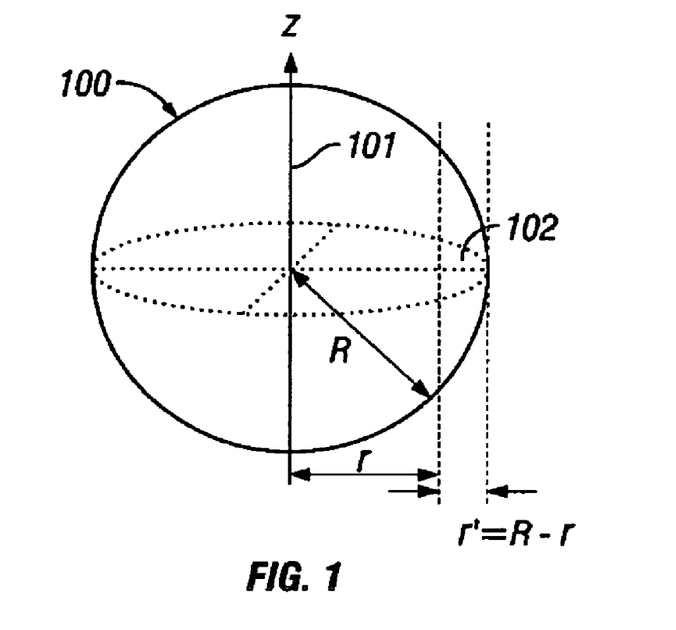
FIGS. 1, 2, 3, 4A, and 4B illustrate various exemplary resonator configurations that support whispering gallery modes and are formed of radiation-sensitive materials for spectral tuning.
Figure 2:
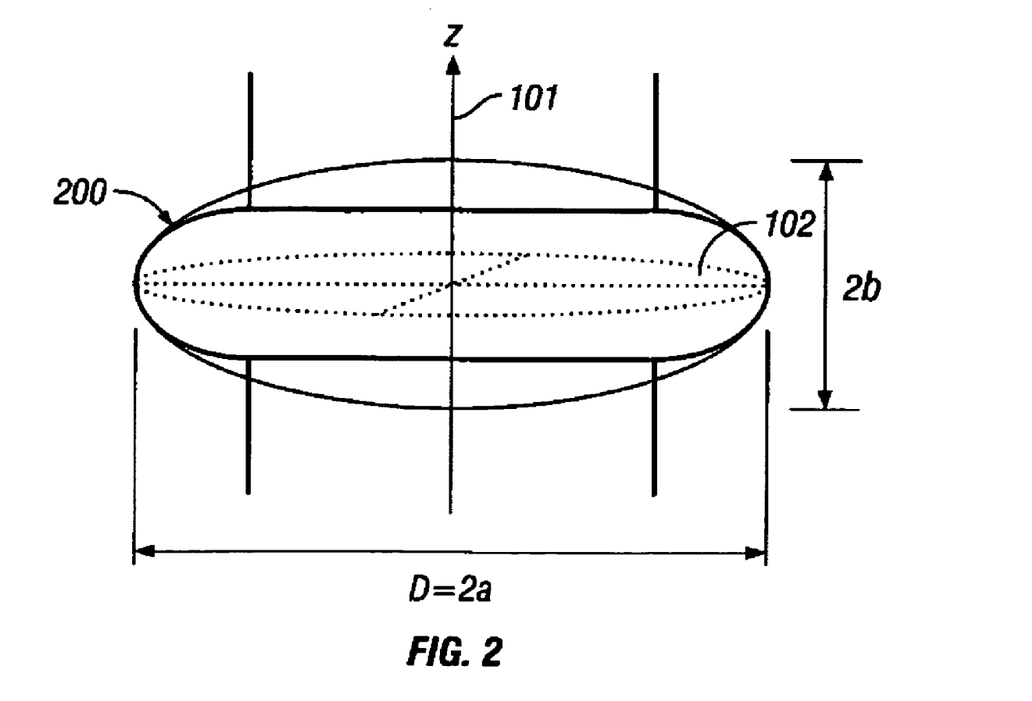
Figure 3:
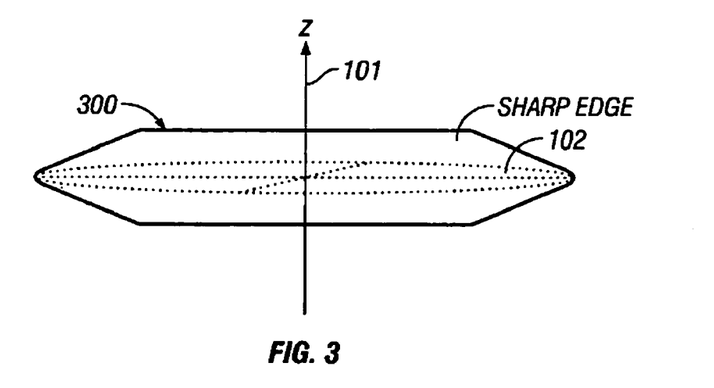

Such tunable WGM resonator filters may use WGM resonators in different resonator geometries. FIGS. 1, 2, and 3 illustrate three exemplary geometries for implementing such WGM resonators.

FIG. 1 shows a spherical WGM resonator 100 which is a solid dielectric sphere. The sphere 100 has an equator in the plane 102 which is symmetric around the z axis 101. The circumference of the plane 102 is a circle and the plane 102 is a circular cross section. A WG mode exists around the equator within the spherical exterior surface and circulates within the resonator 100. The spherical curvature of the exterior surface around the equator plane 102 provides spatial confinement along both the z direction and its perpendicular direction to support the WG modes. The eccentricity of the sphere 100 generally is low.

FIG. 2 shows an exemplary spheriodal microresonator 200. This resonator 200 may be formed by revolving an ellipse (with axial lengths a and b) around the symmetric axis along the short elliptical axis 101 (z). Therefore, similar to the spherical resonator in FIG. 1, the plane 102 in FIG. 2 also has a circular circumference and is a circular cross section. Different from the design in FIG. 1, the plane 102 in FIG. 2 is a circular cross section of the non-spherical spheroid and around the short ellipsoid axis of the spheroid. The eccentricity of resonator 100 is $(1-b^2/a^2)^{1/2}$ and is generally high, e.g., greater than $10^{-1}$. Hence, the exterior surface is the resonator 200 is not part of a sphere and provides more spatial confinement on the modes along the z direction than a spherical exterior. More specifically, the geometry of the cavity in the plane in which Z lies such as the zy or zx plane is elliptical. The equator plane 102 at the center of the resonator 200 is perpendicular to the axis 101 (z) and the WG modes circulate near the circumference of the plane 102 within the resonator 200.

FIG. 3 shows another exemplary WGM resonator 300 which has a non-spherical exterior where the exterior profile is a general conic shape which can be mathematically represented by a quadratic equation of the Cartesian coordinates. Similar to the geometries in FIGS. 1 and 2, the exterior surface provides curvatures in both the direction in the plane 102 and the direction of z perpendicular to the plane 102 to confine and support the WG modes. Such a non-spherical, non-elliptical surface may be, among others, a parabola or hyperbola. Note that the plane 102 in FIG. 3 is a circular cross section and a WG mode circulates around the circle in the equator.

The above three exemplary geometries in FIGS. 1, 2, and 3 share a common geometrical feature that they are all axially or cylindrically symmetric around the axis 101 (z) around which the WG modes circulate in the plane 102. The curved exterior surface is smooth around the plane 102 and provides two-dimensional confinement around the plane 102 to support the WG modes.

Notably, the spatial extent of the WG modes in each resonator along the z direction 101 is limited above and below the plane 102 and hence it may not be necessary to have the entirety of the sphere 100, the spheroid 200, or the conical shape 300. Instead, only a portion of the entire shape around the plane 102 that is sufficiently large to support the whispering gallery modes may be used to for the WGM resonator. For example, rings, disks and other geometries formed from a proper section of a sphere may be used as a spherical WGM resonator.

Figure 4A:
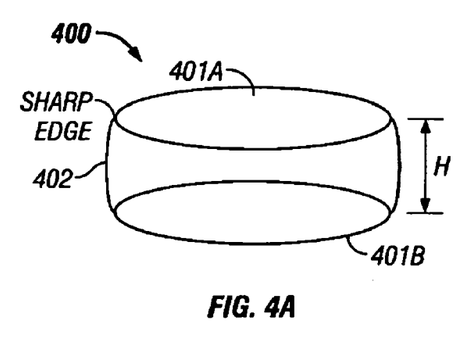
Figure 4B:
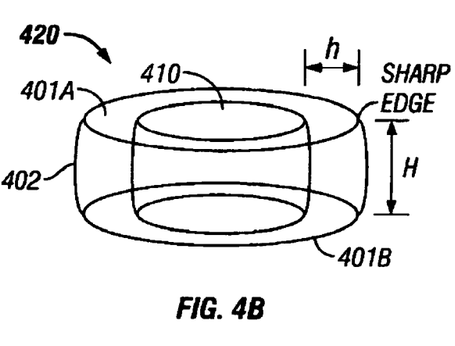

FIGS. 4A and 4B show a disk-shaped WGM resonator 400 and a ring-shaped WGM resonator 420, respectively. In FIG. 4A, the solid disk 400 has a top surface 401A above the center plane 102 and a bottom surface 401B below the plane 102 with a distance H. The value of the distance H is sufficiently large to support the WG modes. Beyond this sufficient distance above the center plane 102, the resonator may have sharp edges as illustrated in FIGS. 3, 4A, and 4B. The exterior curved surface 402 can be selected from any of the shapes shown in FIGS. 1, 2, and 3 to achieve desired WG modes and spectral properties. The ring resonator 420 in FIG. 4B may be formed by removing a center portion 410 from the solid disk 400 in FIG. 4A. Since the WG modes are present near the exterior part of the ring 420 near the exterior surface 402, the thickness h of the ring may be set to be sufficiently large to support the WG modes.

Figure 5A:
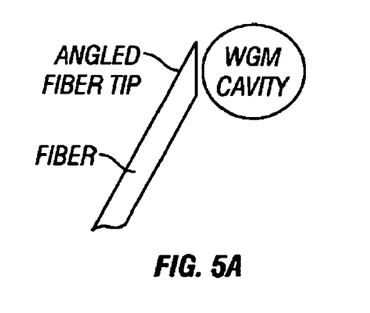
FIGS. 5A and 5B illustrate two evanescent coupling examples.
Figure 5B:
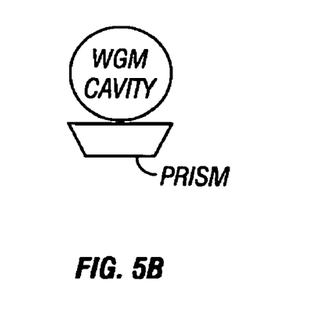

An optical coupler is generally used to couple optical energy into or out of the WGM resonator by evanescent coupling. FIGS. 5A and 5B show two exemplary optical couplers engaged to a WGM resonator. The optical coupler may be in direct contact with or separated by a gap from the exterior surface of the resonator to effectuate the desired critical coupling. FIG. 5A shows an angle-polished fiber tip as a coupler for the WGM resonator. A waveguide with an angled end facet, such as a planar waveguide or other waveguide, may also be used as the coupler. FIG. 5B shows a micro prism as a coupler for the WGM resonator. Other evanescent couplers may also be used, such as a coupler formed from a photonic bandgap material.

In WGM resonators with uniform indices, a part of the electromagnetic field of the WG modes is located at the exterior surface of the resonators. A gap between the optical coupler and the WGM resonator with a uniform index is generally needed to achieve a proper optical coupling. This gap is used to properly "unload" the WG mode. The Q-factor of a WG mode is determined by properties of the dielectric material of the WGM resonator, the shape of the resonator, the external conditions, and strength of the coupling through the coupler (e.g. prism). The highest Q-factor may be achieved when all the parameters are properly balanced to achieve a critical coupling condition. In WGM resonators with uniform indices, if the coupler such as a prism touches the exterior surface of the resonator, the coupling is strong and this loading can render the Q factor to be small. Hence, the gap between the surface and the coupler is used to reduce the coupling and to increase the Q factor. In general, this gap is very small, e.g., less than one wavelength of the light to be coupled into a WG mode. Precise positioning devices such as piezo elements may be used to control and maintain this gap at a proper value.

A tunable WGM resonator filter may be, at least in part, made of a material whose index changes in response to an applied stimulus such as a radiation field or an electric field. Such a tuning mechanism may be used to tune the transmission peak of the filter and in particular to provide dynamic tuning capability in certain applications. In addition, the tuning may be used to avoid certain complications associated with a change in the shape or dimension of the resonator and may be further used to compensate for certain variations during operation of the filter. For example, an electro-optic material may be used to construct the entire WGM resonator or the portion of the WGM resonator where the WG modes are present. An external electric field may be applied to change the refractive index of the resonator in tuning the resonator.

Figure 6A:
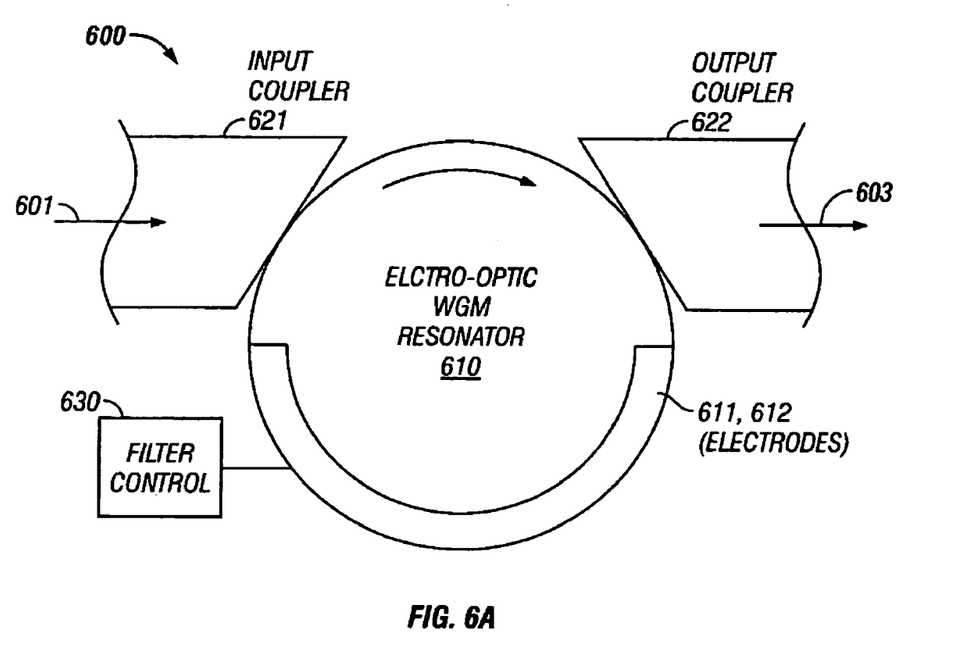
FIGS. 6A and 6B show one implementation of a tunable WGM resonator filter based on an electro-optic effect.
Figure 6B:
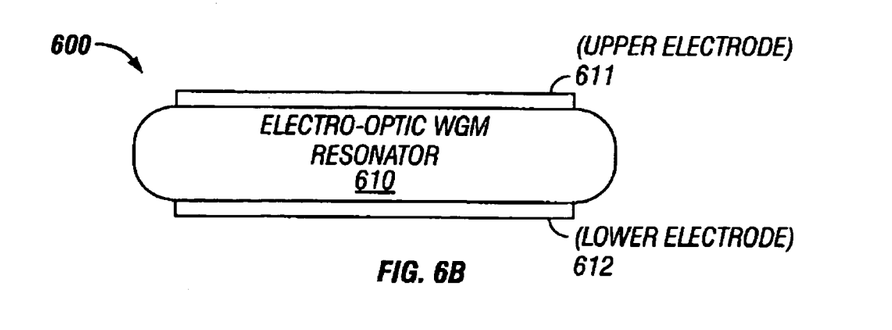

FIGS. 6A and 6B show an example of a tunable electro-optic WGM resonator filter 600. The electrooptic material for the entirety or part of the resonator 610 may be any suitable material, including an electrooptic crystal such as Lithium Niobate and semiconductor multiple quantum well structures. One or more electrodes 611 and 612 may be formed on the resonator 610 to apply a control electrical field in at least the region where the WG modes are present to control the index of the electro-optical material and to change the filter function of the resonator. Assuming the resonator 610 has disk or ring geometry as in FIG. 4A or 4B, the electrode 611 may be formed on the top of the resonator 610 and the electrode 612 may be formed on the bottom of the resonator 610 as illustrated in the side view of the device in FIG. 6B. In one implementation, the electrodes 611 and 612 may constitute an RF or microwave resonator to apply the RF or microwave signal to copropagate along with the desired optical WG mode. For example, the electrodes 611 and 612 may be microstrip line electrodes. The electrodes 611 and 612 may also form an electrical waveguide to direct the electrical control signal to propagate along the paths of the WG modes. A filter control unit 630 such as a control circuit may be used to supply the electrical control signal to the electrodes 611 and 612.

In operating the filter 600, the filter control unit 630 may supply a voltage as the electrical control signal to the electrodes 611 and 612. In some operations, the control voltage may be a DC voltage to bias the transmission peak of the filter 600 at a desired spectral location. The DC voltage may be adjusted by the control unit 630 to tune the spectral position of the transmission peak when such tuning is needed. For dynamic tuning operations, the control unit 630 adjusts the control voltage in response to a control signal to, e.g., maintain the transmission peak at a desired spectral position or frequency or to change the frequency of the transmission peak to a target position. In some other operations, the control unit 630 may adjust the control voltage in a time varying manner, e.g., scanning the transmission peak at a fixed or varying speed or constantly changing the transmission peak in a predetermined manner.

The tunable WGM resonator filter 600 is shown to include two optical couplers 621 and 622. The coupler 621 is the input coupler which couples an input optical signal 601 into the resonator 610 for filtering. The coupler 622, generally located at a location different from the input coupler 621, couples the filtered light out of the resonator 610 as the filtered output signal 602. Tapered fibers and prisms may be used to implement the couplers 621 and 622. Other implementations for the couplers may also be possible. For example, a photonic gap material may be used as an optical coupler.

Figure 7:
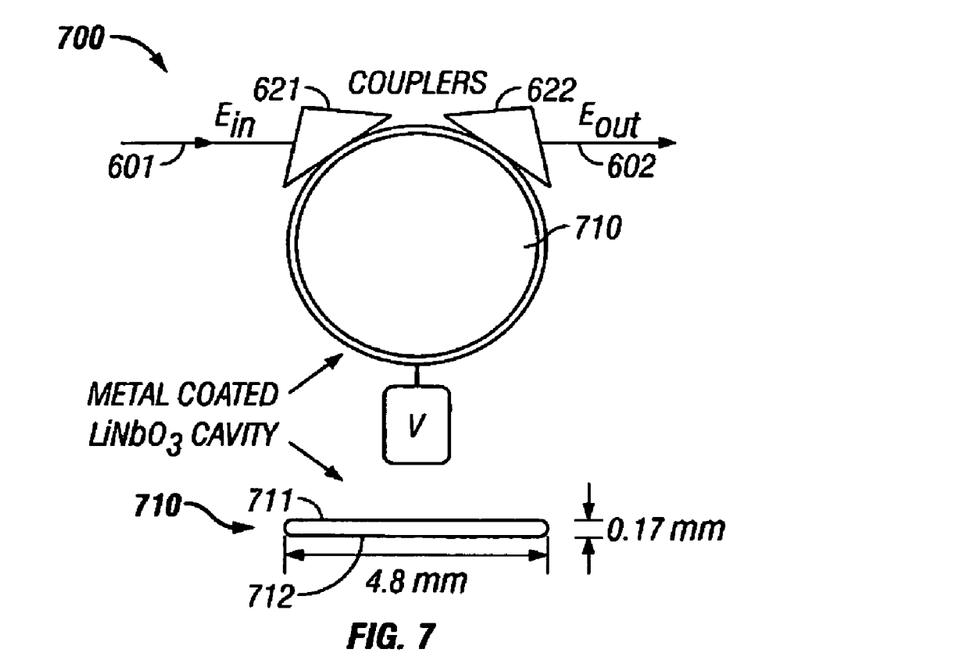
FIG. 7 shows another implementation of a tunable WGM resonator filter based on an electro-optic effect.

FIG. 7 shows another example of a tunable WGM resonator filter 700. The WGM resonator is a micro disk WGM resonator 710 fabricated from a electro-optic material wafer such as commercial lithium niobate wafers. In one example, a Z-cut LiNbO$_3$ disk cavity with a diameter of d=4.8 mm and a thickness of 170 µm may be used. The cavity perimeter edge may be prepared in the toroidal shape with a 100 µm radius of curvature. Several nearly identical disks were fabricated and compared. The repeatable value of the quality factor of the main sequence of the cavity modes is Q=5×10$^6$ (the observed maximum is Q=5×10$^7$), which corresponds to the 30 MHz bandwidth of the mode. Light is sent into and retrieved out of the cavity via coupling diamond prisms. The repeatable value of fiber-to-fiber insertion loss with this technique is 20 dB (the minimum measured insertion loss is approximately 12 dB). The maximum transmission is achieved when light is resonant with the cavity modes.

The top and bottom surfaces of the disk resonator 710 are coated with conductive layers 711 and 712, respectively, for receiving the external electrical control signal. A metal such as indium may be used to form the conductive coatings 711 and 712. Tuning of the filter 700 is achieved by applying a voltage to the top and bottom conductive coatings. Each conductive coating may be absent on the central part of the resonator and are present at the perimeter edge of the resonator where WGMs are localized. This design of the conductive coatings can reduce the overall impedance of the electrical path and hence reduce the tuning time of the filter 700.

The maximum frequency shifts of the TE and TM modes may be respectively written as follows:

$$\Delta v_{TE} = v_0 \frac{n_e^2}{2} r_{33} E_Z, \text{ and}$$

$$\Delta v_{TM} = v_0 \frac{n_0^2}{2} r_{13} E_Z;$$

where $v_0=2\times10^{14}$ Hz is the carrier frequency of the input optical signal and is the lasing frequency of a laser that generates the input signal, $r_{33}=31$ pm/V and $r_{13}=10$ pm/V are the electro-optic constants of the Z-cut LiNbO$_3$, $n_0=2.28$ and $n_e=2.2$ are the refractive indices of LiNbO$_3$ along two orthogonal birefringent axes.

Notably, TE and TM modes may be selected in operating such filters according the needs of specific applications. For example, the TM modes may be used because they produce better quality factors than the TE modes in some applications where a high quality factor or a narrow filter linewidth is desirable. If the quality factor is not very important, the TE modes may be used because their electro-optic shifts are three times as much as those of TM modes for the same values of the applied voltage. The use of TE modes may also reduce the needed electrical power.

Figure 8:
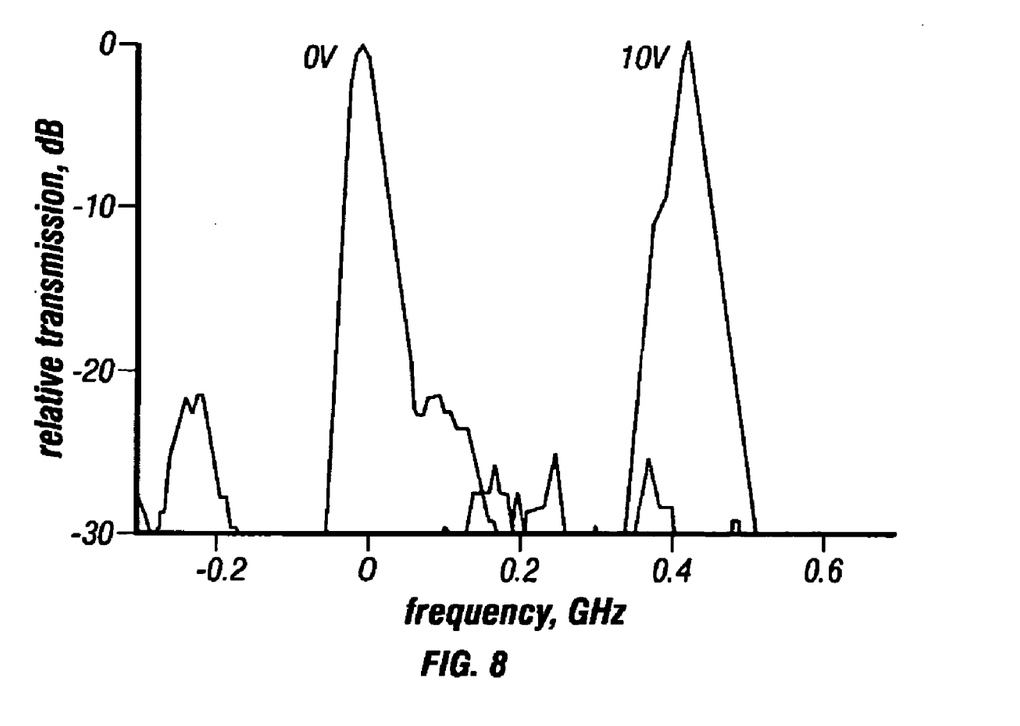
FIG. 8 shows a measured transmission spectrum of a filter based on the design in FIG. 7, where the maximum transmission corresponds to an attenuation of 12 dB of the input signal.

FIG. 8 shows experimentally measured electro-optic tuning of the filter spectral response and tuning of the center wavelength with the applied voltage for a LiNbO3 WGM filter based on the design in FIG. 7. Changing the tuning voltage from zero to 10V shifts the spectrum of the filter by 0.42 GHz for the TM polarization, in agreement with the theoretical value. This particular filter exhibits a linear voltage dependence in a tuning range of ±150V and the total tuning span exceeds the free spectral range (FSR) of the WGM cavity.

The dependence $\Delta v(E_Z)$ has a hysteresis feature when a large DC electric field ($E_Z$>2 MV/m) is applied to the cavity. A rapid change in the applied voltage results in an incomplete compensation of the mode shift, i.e. $\Delta v(E_Z=0) \neq 0$, and the resonance frequency returns to its initial position several seconds after the electric field is switched off. The maximum frequency tuning of the filter in this nonlinear regime was approximately 40 GHz.

The insertion losses in the above exemplary filter are found to be primarily due to the inefficient coupling technique with the diamond prism configuration. In this regards, an antireflection coating may be applied to the coupling prisms to reduce such losses. Also, a special grating may be placed on a high-index fiber as the optical coupler to significantly reduce the losses.

Figure 9:
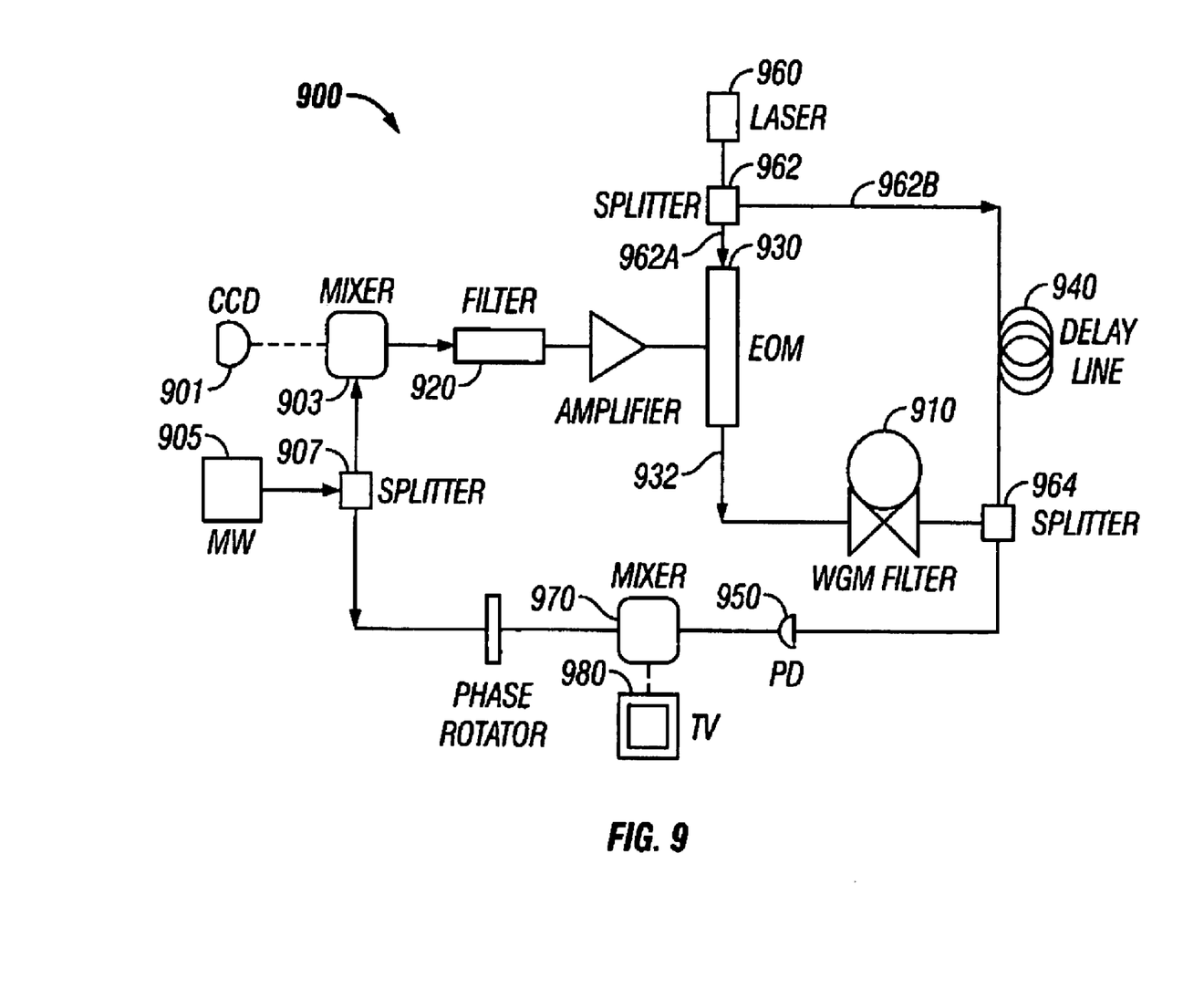
FIG. 9 illustrates a signal transmission system using a tunable WGM filter based on the design in FIG. 7.

FIG. 9 shows a signal transmission system 900 that uses a tunable WGM filter 910 in an optical fiber line to transmit a video signal. Such transmission lines might be important for the development of portable optical domain microwave navigation and communication devices that can provide significantly higher capability in applications such as NASA planetary explorations. A video signal with an approximately 20 MHz FWHM bandwidth and zero carrier frequency is sent from a CCD camera 901 to a mixer 903, where it is mixed with a 10 GHz microwave carrier generated from a microwave source 905. The resulting modulated microwave signal is filtered by a filter 920 to suppress the higher harmonic signal components, and is amplified and unconverted into an optical signal 932 using an optical modulator 930, such as a Mach-Zehnder electro-optic modulator.

A laser 960 is used to produce a unmodulated laser beam, e.g., at 1550 nm. An optical splitter 962 is used to split the laser beam into a first laser beam 962A and a second laser beam 962B. The beam 962A is sent into the optical modulator 930 and is modulated to produce the modulated signal 932. The modulated signal 932 is then sent through an optical filter transmission line having the tunable WGM filter 910. The other unmodulated beam 962B is sent through an optical delay line 940, e.g., a fiber loop, to an optical splitter 964 which operates as a combiner to combine the unmodulated beam 962B and the filtered modulated signal 932. This combination provides a heterodyned detection mechanism and can reduce the effect of the noise in the laser 960. An optical detector 950 such as a fast photodiode, is then used to receive and detect the combined signal from the optical splitter 964. If the laser 960 can produce a stabilized laser output, the optical delay line 940 and the combining beam splitter 964 may be removed from the system 900. The filtered optical signal 932 produced by the filter 910 may be directly sent to the detector 950.

The photodiode output is mixed with a microwave carrier by a mixer 970 to restore the initial signal. The microwave carrier here operates as a local oscillator. In the example shown in FIG. 9, this microwave carrier is split off from the microwave output from the microwave source 905. A display unit 980 such as a TV may be used to display the restored video signal.

In this example, in order to characterize the filtered signal and to retrieve the encoded information, the filter output from the filter 910 is mixed with the light field 962B and measured with a photodiode 950. The filter 910 is a high-Q WGM cavity that adds a group delay to the signal. If the laser 960 used in the experiment has a large linewidth, this group delay can result in a frequency-to-amplitude laser noise conversion, unless the scheme is balanced. To avoid this conversion, the WGM filter 910 is inserted into a Mach-Zehnder configuration with a fiber delay line $L_f$ to compensate for the group delay. The delay line length is equal to $L_f=dn_0F/2n_f=1.2$ m, where $n_f=1.5$ is the refractive index of the fiber material and F=300 is the cavity finesse. Such a compensation may not be needed if the laser linewidth is much smaller than the width of the cavity resonance. In testing the system 900, the optical characterization of the filter was achieved using a semiconductor diode laser as the laser 960 with a 30 MHz FWHM line, which is quite large. The laser power in the fiber was approximately 2.5 mW.

Figure 10:
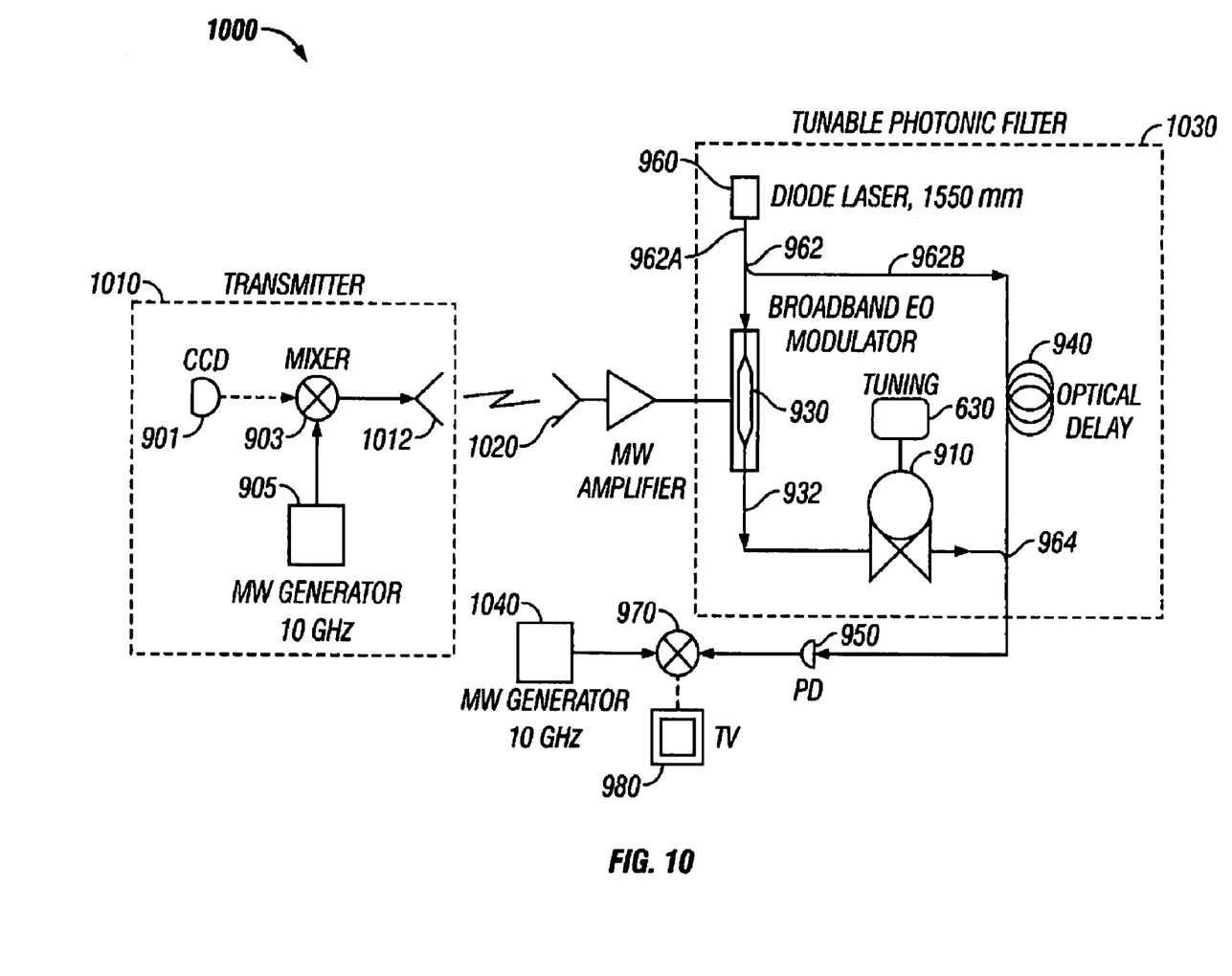
FIG. 10 shows one implementation of a microwave or RF transmitter-receiver system based on the design in FIG. 9.

The basic layout in the system 900 in FIG. 9 may be used to construct a microwave or RF transmitter-receiver system. FIG. 10 illustrates one implementation 1000 having a microwave transmitter 1010 and a tunable photonic microwave filter 1030. The transmitter 1010 has a transmitter antenna to send out a microwave signal through the air. A receiver antenna 1020 receives the signal from the transmitter 1010 in the air and sends the received signal to the photonic filter 1030. As in the system 900, the tunable WGM filter 910 is used to selectively transmit the modulated optical signal 932 from the optical modulator 930. The filter 910 is tuned by the control unit 630. The microwave signal transmitted by the transmitter 1020 may include multiple channels of signals at different channel frequencies, e.g., different video signals from different video sources such as different CCD cameras. If the bandwidth of each channel is equal to or less than the bandwidth of the optical filter 910 and different channels are sufficiently spaced in the modulated optical signal 932, the optical filter 910 may be tuned to select one channel in the received signal to be displaced at the TV 980 while optically rejecting other channels carried by the optical signal 932. In this context, the system 1000 may be used in a broadcast system where each receiver can be operated to select any channel in the broadcast signal. A local RF or microwave generator 1040 is implemented to provide the local oscillator signal to the mixer 970 in restoring the desired channel signal.

Tunable optical filters are the important elements for various optical devices and systems. Examples of such devices and systems include reconfigurable networking wavelength division multiplexing (WDM and analog RF photonics communication links. Desirable characteristics for the filters include fast tuning speed, small size, wide tuning range, low power consumption, and low cost. Wavelength demultiplexing and channel sections in WDM systems may require tunable narrow-band optical filters that are compatible with single mode fibers.

Fabry-Perot and fiber Fabry-Perot tunable filters are among the vast variety of tunable optical filters. Fabry-Perot filters are characterized by the finesse, a useful figure of merit, which is equal to the ratio of the filter free spectral range (FSR) and the bandwidth. Finesse indicates how many channels can fit in one span of the FSR. A Fabry-Perot filter typically has a finesse of about 100, a bandwidth of about 125 GHz, and a tuning speed in the millisecond range. These filters also meet −20 dB channel-to-channel isolation condition for 50 GHz channel spacing.

Tunable WGM filters described in this application may be characterized by similar parameters as with Fabry-Perot filters. A comparison between the present tunable WGM filters and the Fabry-Perot filters shows that the tunable WGM filters are superior to Fabry-Perot filters. For example, tunable WGM filters can be designed to operate in a wide spectral range. Using the lithium niobate as the electro-optical material, tunable WGM filters may operate at wavelengths only limited by the absorption loss of lithium niobate and the operating wavelength may range from about 1.0 to 1.7 µm. Notably, this range includes the communication C band around the 1.55 µm wavelength. The reproducible value of finesse of the filter (F) exceeds F=300 and may be as high as F=1000. The tuning speed of the tunable WGM filters may be approximately 10 ns, while the actual spectrum shifting time in some implementations is determined by the filter's 30 MHz bandwidth and does not exceed 30 µs. At least −20 dB suppression of the channel cross-talk for a 50 MHz channel spacing has been observed.

Only a few implementations are disclosed. However, it is understood that variations and enhancements may be made.

What is claimed is:

1. A method for filtering an optical signal, comprising:
   directing an input optical signal into an optical resonator configured to support whispering gallery modes and comprising a portion where the whispering gallery modes are present, wherein at least the portion of the optical resonator exhibits an electro-optical affect;
   coupling light out of the optical resonator to produce a filtered optical output from the input optical signal;
   applying an electrical control signal to at least the portion in the optical resonator to tune a spectral transmission peak of the optical resonator and thus to select spectral components in the input optical signal in the filtered optical output;
   receiving an input electrical signal carrying multiple signal channels;
   optically modulating an optical beam with the input electrical signal to produce a modulated optical signal as the input optical signal which carries the multiple signal channels as the signal;
   tuning the spectral transmission peak of the optical resonator to transmit a selected signal channel in the filtered optical output while optically rejecting other signal channels; converting the filtered optical output into an electrical signal; and
   extracting the selected channel from the electrical signal.

2. The method as in claim 1, further comprising using TM modes in whispering gallery modes when coupling the input optical signal, into the optical resonator and coupling light out of the optical resonator.

3. The method as in claim 1, further comprising using at least one portion of a nonspherical geometry in the optical resonator to support the whispering gallery modes.

4. The method as in claim 3, wherein the nonspherical geometry is a spheroid.

5. The method as in claim 3, further comprising using at least one portion of a sphere as the optical resonator.

6. The method as in claim 1, further comprising using a disk resonator as the optical resonator.

7. The method as in claim 1, further comprising using TE modes in whispering gallery modes when coupling the input optical signal into the optical resonator and coupling light out of the optical resonator.

8. A method for filtering an optical signal, comprising:
   directing an input optical signal into an optical resonator configured to support whispering gallery modes and comprising a portion where the whispering gallery modes are present, wherein
   at least the portion of the optical resonator exhibits an electro-optical effect;
   coupling light out of the optical resonator to produce a filtered optical output from the input optical signal;
   applying an electrical control signal to at least the portion in the optical resonator to tune a spectral transmission peak of the optical resonator and thus to select spectral components in the input optical signal in the filtered optical output;
   splitting an unmodulated optical beam into first and second beams;
   modulating the first beam as the input optical signal;
   directing the second beam through an optical delay path;
   combining the filtered optical output and the second beam after the optical delay path to produce a combined optical signal;
   converting the combined optical signal into an electrical signal; and
   extracting the signal from the electrical signal.

9. The method as in claim 8, further comprising using TM modes in whispering gallery modes when coupling the input optical signal into the optical resonator and coupling light out of the optical resonator.

10. The method as in claim 8, further comprising using at least one portion of a nonspherical geometry in the optical resonator to support the whispering gallery modes.

11. The method as in claim 10, wherein the nonspherical geometry is a spheroid.

12. The method as in claim 10, further comprising using at least one portion of a sphere as the optical resonator.

13. The method as in claim 8, further comprising using a disk resonator as the optical resonator.

14. The method as in claim 8, further comprising using TE modes in whispering gallery modes when coupling the input optical signal into the optical resonator and coupling light out of the optical resonator.

15. A device, comprising a receiver to receive a radiation signal carrying a plurality of signal channels and to extract a selected channel from the received signal channels, wherein the receiver comprises:
   an optical modulator to modulate an optical beam in response to the radiation signal to produce a modulated optical signal carrying the signal channels,
   a tunable optical filter having (1) an optical resonator which is configured to support whispering gallery modes and comprise at least a portion where the whispering gallery modes are present, wherein at least the portion of the optical resonator exhibits an electro-optical effect, (2) at least one electrode formed on the optical resonator to guide an electrical control signal into the optical resonator to spatially overlap with the whispering gallery modes, and (3) a control unit coupled to the at least one electrode to supply an electrical control signal to the one portion to tune a refractive index and thus a transmission peak of the optical resonator via the electro optical effect, wherein the optical filter is located to receive and filter the modulated optical signal to produce a filtered optical output that carries only the selected signal channel,
   an optical detector to convert the filtered optical output into an electrical signal, and
   a mixer that mixes the electrical signal with a reference signal to extract the selected signal channel.

16. The device as in claim 15, wherein said tunable optical resonator includes a lithium niobate crystal.

17. The device as in claim 15, further comprising an optical coupler that is evanescently coupled to the optical resonator.

18. A tunable filter, comprising:
   an optical modulator having an input port to receive an input signal at an RF or microwave frequency and responsive to the input signal to modulate a first light beam at an optical carrier frequency to carry the input signal;

a light source to produce a light beam;

an optical splitter to split the light beam into the first light beam directed through the optical modulator and a second light beam directed through a separate optical path;

an optical resonator positioned to receive and filter the modulated light from the optical modulator to produce a filtered optical output, the optical resonator supporting whispering gallery modes and comprising a portion where the whispering gallery modes are present, wherein at least the portion of the optical resonator exhibits an electro-optical effect;

a resonator control unit to supply an electrical control signal to at least the portion in the optical resonator to tune a spectral transmission peak of the optical resonator and thus to select one or more spectral components in the input optical signal in the filtered optical output;

an optical combiner to combine the filtered optical output and the second light beam to produce a combined optical signal; and an optical detector to convert the combined optical signal into an output signal which carries the selected one or more spectral components.

19. The filter as in claim 18, further comprising an optical delay element in the separate optical path through which the second light beam passes.

20. The filter as in claim 18, further comprising:

an input optical coupler that is evanescently coupled to the optical resonator and couples light from the optical modulator into the optical resonator; and an output optical coupler that is evanescently coupled to the optical resonator and couples the filtered optical output out of the optical resonator.

21. The filter as in claim 20, wherein at least one optical coupler is a fiber coupler.

22. The filter as in claim 20, wherein at least one optical coupler comprises a waveguide coupler.

23. The filter as in claim 20, wherein at least one optical coupler comprises a photonic gap material.

24. The filter as in claim 20, wherein at least one optical coupler comprises a prism.

25. The filter as in claim 20, wherein the input and output optical couplers couple TM modes in whispering gallery modes.

26. The filter as in claim 18, wherein the optical resonator comprises one portion of a nonspherical geometry to support the whispering gallery modes.

27. The filter as in claim 18, wherein the optical resonator comprises at least a portion of a spheroid to support the whispering gallery modes.

28. The filter as in claim 18, wherein the optical resonator comprises at least one portion of a sphere to support the whispering gallery modes.

29. A method for filtering an input signal at an RE or microwave frequency to produce a filtered output signal, comprising:

deriving first and second optical beams from a CW light beam;

directing the first optical beam through an optical modulator to produce a modulated optical beam;

applying the input signal to control the optical modulator in modulating the first optical beam to carry the input signal in the modulated optical beam;

directing the second optical beam through a separate optical path:

directing the modulated optical beam through a tunable optical resonator to produce a filtered optical beam, the tunable optical resonator supporting whispering gallery modes and changing a spectral transmission via an electro-optical effect in response to an electrical control signal;

applying the electrical control signal to the optical resonator to tune a spectral transmission peak of the optical resonator and thus to select one or more spectral components in the input optical signal in the filtered optical beam;

combining the filtered optical beam and the second optical beam to produce a combined optical signal; and using a photodetector to convert the combined optical signal into the filtered output signal which carries the selected one or more spectral components.

30. The method as in claim 29, further comprising causing an optical delay in the second optical beam to suppress noise in the filtered output signal.

* * * * *